United States Patent
Dempsey et al.

(10) Patent No.: US 6,507,852 B1
(45) Date of Patent: Jan. 14, 2003

(54) LOCATION-INDEPENDENT SERVICE FOR MONITORING AND ALERTING ON AN EVENT LOG

(75) Inventors: Michael Dempsey, Sanford, FL (US); Guy K. Ishimoto, San Diego, CA (US); Wai Hung Kam, San Diego, CA (US); Steven Jeffrey Schlesinger, Escondido, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/550,672

(22) Filed: Apr. 17, 2000

(51) Int. Cl.⁷ .............................................. G06F 17/30
(52) U.S. Cl. .................................... 707/201; 707/10
(58) Field of Search ............................. 707/1, 10, 201, 707/202, 104, 200; 709/223, 318; 713/201; 370/352; 705/54, 80; 702/187; 714/47

(56) References Cited

U.S. PATENT DOCUMENTS 5,355,327 A * 10/1994 Stent et al. .................. 702/187
5,941,996 A *  8/1999 Smith et al. ................... 714/47
5,966,714 A * 10/1999 Huang et al. ................ 707/201

* cited by examiner

Primary Examiner—Diane D. Mizrahi
(74) Attorney, Agent, or Firm—Gates & Cooper

(57) ABSTRACT

A method, apparatus, and article of manufacture for monitoring and alerting on an event log. One or more alert policies is accessed, wherein each of the alert policies is comprised of one or more rules stored on a computer. An event log stored on a computer is accessed in a location-independent manner to gather one or more event messages stored therein. The event messages are filtered by comparing them to the rules of the alert policies to raise an alert and determine whether an alert action should be invoked.

36 Claims, 5 Drawing Sheets

LOCATION-INDEPENDENT SERVICE FOR MONITORING AND ALERTING ON AN EVENT LOG

CROSS REFERENCE TO RELATED APPLICATIONS

This application is related to the following and commonly-assigned patent application, which is incorporated by reference herein:

Application Ser. No. 09/118,413, now U.S. Pat. No. 6,356,917 entitled "MONITORING AND RAISING ALERTS FOR DATABASE JOBS", filed on Jul. 17, 1998, by Michael Dempsey, Annie Yu-Ju Yang, Wai Hung Kam, and Guy K. Ishimoto.

BACKGROUND OF THE INVENTION

1. Field of the Invention

The present invention relates to systems and methods for data processing, and in particular to a location-independent service for monitoring and alerting on an event log.

2. Description of the Related Art

Computer systems typically write messages describing errors and state changes to system event logs. However, a number of problems exist with system event logs.

These logs are often lengthy and contain very little information that is truly of interest to those who manage such systems. For example, to detect that a host system is behaving in a manner requiring the attention of an administrator, a large quantity of warning and error messages may have to be reviewed to find conditions truly worthy of attention.

In yet another example, while many events of either type A or type B may occur in a specified time period, it may only be of interest when an event (or specified number of events) of type A and type B occur in the same period, and prior art systems cannot identify such situations. Moreover, users are not automatically alerted of important events as they appear in the log.

Furthermore, users may not have access to the host computer on which the system event log is stored. Additionally, systems administrators may want to minimize work executed on the host computer.

Thus, there is a need in the art for the improved processing of system event logs that overcomes these and other problems.

SUMMARY OF THE INVENTION

To address the requirements described above, the present invention discloses a method, apparatus, and article of manufacture for monitoring and alerting on an event log. One or more alert policies is accessed, wherein each of the alert policies is comprised of one or more rules stored on a computer. An event log stored on a computer is accessed in a location-independent manner to gather one or more event messages stored therein. The event messages are filtered by comparing them to the rules of the alert policies to raise an alert and determine whether an alert action should be invoked.

Each rule includes one or more defined criteria selected from a group comprising one or more Event IDs, an Event Period, an Event Count, an Alert Any flag, and a Search Phrase. Event IDs are identifiers that semantically identify the event message. The Event Period indicates a duration within which the event messages must occur in the event log for an alert to be raised and an alert action to be invoked. The Event Count indicates a count of the event messages that must occur within the event log within the Event Period and corresponding to the Event IDs to raise an alert and trigger an alert action. The optional Search Phrase allows the user to specify a word or phrase that must be included within the text of a matching error message (where the match is based on Event ID) in order for that message to be counted.

The Alert Any flag determines whether or not there must be at least one occurrence of each and every Event ID that is specified by the rule (there may be multiple Event IDs). For example, the Alert Any flag may indicate that an alert is to be raised when the count of event messages in the event log equals or exceeds the Event Count within the Event Period for any combination of qualified Event IDs. Alternatively, the Alert Any flag may indicate that an alert is to be raised when the count of event messages in the event log equals or exceeds the Event Count within the Event Period and there has been at least one occurrence of each Event ID in the event messages.

Each rule of an alert policy also specifies one or more Alert Actions. The Alert Action specifies what is to be done when matching errors exceed the specified limit. For example, an Alert Action may comprise: sending an email to a user-defined address, sending a page with a user-defined message to a user-defined paging service, generating a trap, running a user-specified program, writing a message to log, and executing a script of database commands. Each Alert Action may comprise a single defined action, or may comprise a plurality of individual actions. In addition, the Alert Action may specify a period that must expire before the Alert Action is repeated for the same event. These aspects of the alert policies are defined using an alert policy editor.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention comprises a location-independent event log monitoring service that alerts a user to selected events or event combinations. Location independence is achieved via standard network protocols and client/server technology. Alerts are provided in near real-time with a user-adjustable refresh rate as well as user-defined policy conditions.

The present invention makes it possible to set thresholds for time and number of events, such that an alert is only raised when threshold is exceeded, i.e., the specified number of events occur in the specified time period. This means that large quantities of warning and error messages are filtered to identify conditions truly worthy of attention, thereby detecting that a host system is behaving in a manner truly requiring the attention of an administrator.

The present invention can alert the user to the appearance of interesting events as they appear in the log. Complex rules allow users to be alerted of important events.

The present invention can monitor the event log from a network-attached client computer. Thus, users need not be at the same location as the host computer and can minimize the amount of work performed on the host computer.

Hardware and Software Environment

Figure 1:
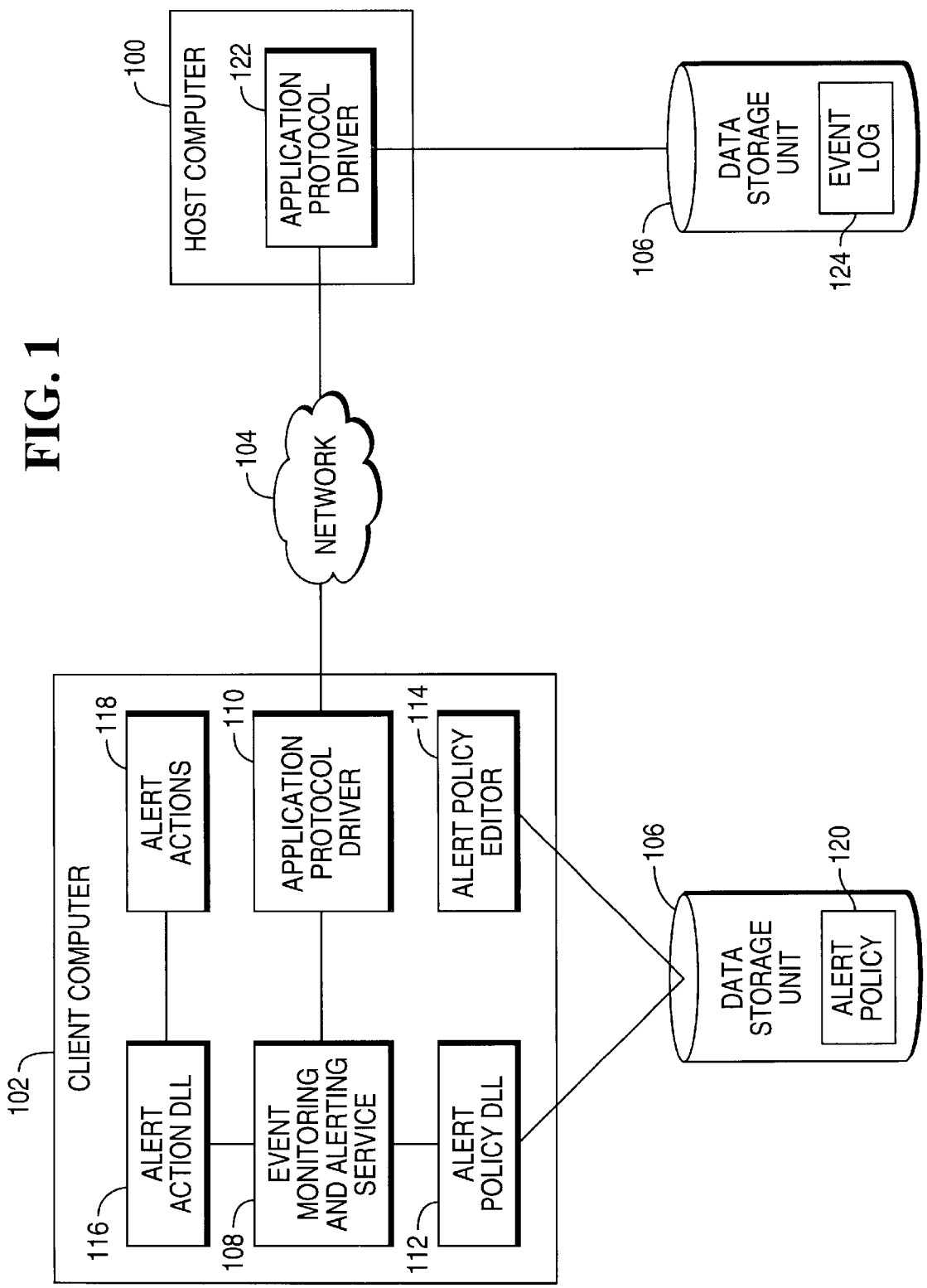
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, one or more Host Computers 100 are connected to one or more Client Computers 102 via a network 104. Both the Host Computers 100 and Client Computers 102 are coupled to one or more fixed and/or removable data storage units (DSUs) 106, such as disk drives. Further, both the Host Computers 100 and Client Computers 102 are coupled to one or more data communications units DCUs), such as network interfaces, that communicate with one or more remote systems or devices via the network 104 or other means.

The present invention includes a number of components executed by the Host Computer 100 and Client Computer 102. The Client Computer 102 executes an Event Log Monitoring and Alerting Service 108, an Application Protocol Driver 110, an (optional) Alert Policy Dynamic Link Library (DLL) 112, an (optional) Alert Policy Editor 114, an Alert Action Dynamic Link Library (DLL) 116, and Alert Actions 118, and maintains an (optional) Alert Policy database 120. The Host Computer 100 executes an Application Protocol Driver 122, and maintains an Event Log 124.

Generally, the Event Log Monitoring and Alerting Service 108, Application Protocol Driver 110, Alert Policy DLL 112, Alert Policy Editor 114, Alert Action DLL 116, Alert Actions 118, Alert Policy database 120, Application Protocol Driver 122, and/or Event Log 124 are tangibly embodied in and/or accessible from a device, media, carrier, or signal, such as RAM, ROM, one or more of the DSUs 106, and/or a remote system or device communicating with the computer via one or more of the DCUs. The Event Log Monitoring and Alerting Service 108, Application Protocol Driver 110, Alert Policy DLL 112, Alert PolicyEditor 114, Alert Action DLL 116, Alert Actions 118, Alert Policy database 120, Application Protocol Driver 122, and/or Event Log 124 each comprise logic and/or data which, when executed, invoked, and/or interpreted, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

For example, although FIG. 1 shows the Host Computer 100 and Client Computer 102 as separate entities, they may, in fact, be one and the same. Thus, in an alternative embodiment of the invention, the Client Computer 102 and Host Computer 100 may be combined into a single computer. One of the benefits of the present invention is that it allows users to choose the implementation that works best for them.

Event Log Monitoring and Alerting Service

At startup, the Event Log Monitoring and Alerting Service 108 reads one or more Alert Policies 120 via the Alert Policy DLL 112. Thereafter, it periodically queries the Event Log 124 via the Application Protocol Drivers 110 and 122. The Event Log Monitoring and Alerting Service 108 triggers Alert Actions 118 via the Alert Action DLL 116 when one or more event messages, or combinations thereof, in the Event Log 124 meet the criteria specified in the Alert Policies 120.

The Event Monitoring and Alerting Service 108 also checks periodically for updated Alert Policies 120. If the Alert Policy 120 has changed since the last iteration, then the Event Monitoring and Alerting Service 108 dynamically adopts the updated Alert Policy 120.

Application Protocol Drivers

The Client-side Application Protocol Driver 110 is a library of functions that allows clients, such as the Event Monitoring and Alerting Service 108, to access a data source, such as the Event Log 124. This driver 110 essentially sends requests from the Client Computer 102 across the network 104 to the Host Computer 100.

The Server-side Application Protocol Driver 122 is a library of functions that listen for requests from Client Computers 102 over the network 104, execute some function to perform the request, and send responses back to the Client Computer 102. Together, the Client-side Application Protocol Driver 110 and Server-side Application Protocol Driver 122 hide the complexities of the network 104, making it easier for applications on the Client Computer 102 to access the Event Log 124 on the Host Computer 100. The present invention leverages this technology to provide location independence.

Event Log

The Event Log 124 is created and updated by a software system running on the Host Computer 100. The Event Log 124 can be queried programmatically, e.g., via an ODBC (Open Database Connectivity) application programming interface (API). Individual event messages in the Event Log 124 are tagged with a semantic identifier that describes the nature of the event, e.g., identifier 123 might be an error indicating that an invalid password was entered. Event messages in the Event Log 124 are timestamped to indicate the date and time when the event occurred.

Alert Policy

An Alert Policy 120 contains the criteria by which the Event Monitoring and Alerting Service 108 searches the Event Log 124, filters event messages, raises alerts, and triggers Alert Actions 118.

The Alert Policy 120 comprises a set of user-defined rules, wherein each rule in an Alert Policy 120 includes the following set of user-defined criteria:

- EventIDList: One or more event identifiers (EventIDs). If more than one EventID is defined for a rule, then each occurrence of any of the rule's EventIDs is counted towards the criteria.
- EventPeriod: The period, measured in minutes, within which event messages must occur for an alert to be raised and an Alert Action 118 to be triggered. At most, one alert will be raised and one Alert Action 118 will be triggered within this period.
- EventCount: The number of occurrences of event messages on this rule's EventIDList that raise an alert and trigger an Alert Action 118. All such event messages must occur within EventPeriod minutes in order for an alert to be raised and an Alert Action 118 to be triggered.

AlertAny: TRUE indicates that an alert is to be raised and an Alert Action 118 is to be triggered when the count of event messages equals or exceeds EventCount within EventPeriod minutes for any combination of qualified Event IDs. FALSE indicates that an alert is to be raised and an Alert Action 118 is to be triggered when the count of event messages equals or exceeds EventCount within EventPeriod minutes and there has been at least one occurrence of each Event ID listed in EventIDList.

Optional Search Phrase: his allows the user to specify a word or phrase that must be included within the text of a matching error message (where the match is based on Event ID) in order for that message to be counted.

Each rule in an Alert Policy 120 also specifies one or more Alert Actions 118. The Alert Action 118 specifies what is to be done when matching errors exceed the specified limit. Examples of Alert Actions 118 include sending an email to a user-defined address, sending a page with a user-defined message to a user-defined paging service, generating an SNMP (Simple Network Management Protocol) trap, running a user-specified program, writing a message to log, and executing a script of database commands. An Alert Action 118 may also be defined to be a plurality of individual Alert Actions 118. In addition, the Alert Action 118 may specify a period that must expire before the Alert Action is repeated for the same event.

Although FIG. 1 shows the Alert Policies 120 being stored persistently on the Client Computer 102, they can actually reside on any computer to which the Event Monitoring and Alerting Service 108 has access. The Alert Policies 120 might also be hardcoded within the Event Monitoring and Alerting Service 108.

Alert Policy Editor

The Alert Policy Editor 114 provides a graphical user interface (GUI) through which users define the Alert Policy 120. Although FIG. 1 shows the Alert Policy Editor 114 on the Client Computer 102, it can actually run on any computer that has network access to the Alert Policies 120.

Alert Policy DLL

The AlertPolicy DLL 112 provides the following API to retrieve the Alert Policies 120.

int GetEventPolicy(char* name, int version, int rate, PolicyData* policy);

Return value:

if ==0, then the policy was retrieved successfully.

if !=0, then an error occurred.

Parameters:

name/input/Text string that identifies the Alert Policy 120 being requested. This value may correspond to the name of the system to which the Alert Policy 120 applies.

version/output/Version number of the current Alert Policy 120.

rate/output/Refresh rate for the current Alert Policy 120. The frequency in seconds at which the Service 108 is to check the Event Log 124 for new event messages.

policy/output/Pointer to a list of PolicyData structures that describe the current Alert Policy 120. Each list element corresponds to one rule of the Alert Policy 120.

struct_PolicyData{
short sEventCount;
short sEventPeriod;
short sAlertAny,
char szDescription[121];
char szAction[61];
char szIDList[121];
char szPhrase[61];
struct_PolicyData *pxnt;
};
typedef struct_PolicyData PolicyData;

With regard to this API, the fields of the structure are defined as follows:

sEventCount—Number of times an event message listed in szCodeList must occur for this rule to be triggered.

sEventPeriod—Amount of time, in minutes, within which sEventCount occurrences of event messages must occur.

sAlertany—Non-zero (TRUE) when any combination of event messages listed in szIDList counts towards the total indicated by sEventCount. Zero (FALSE) when at least one occurrence of each Event ID listed in szIDList must be found within sEventPeriod and the total number of event messages must equal sEventCount.

szDescription—User-defined name for this rule.

szAction—Name of the Alert Action 118 to be executed when the conditions of this rule are met. This name is passed to the Alert Action DLL 116 as the "action_type" parameter to the RaiseLogicalAction API.

szIDList—Comma-delimited list of Event IDs. Each occurrence of any event message whose Event ID is in szIDList counts toward the sEventCount threshold.

szPhrase—Optional search phrase.

*pxnt—Next item in list of rules.

The invention can work with any implementation of Alert Policy 120 and Alert Policy Editor 114 that has a supporting AlertPolicy DLL 112 as described here.

Alert Action DLL

The Alert Action DLL 116 is a library of functions comprising an application programming interface (API) that perform various Alert Actions 118, such as sending a page, sending an email message, generating an SNMP (Simple Network Management Protocol) trap, writing a message to log, or executing a script of database commands. The Event Monitoring and Alerting Service 108 invokes these functions to alert users of important events (as determined by the Alert Policy 120).

The Alert Action DLL 116 provides the following API to initiate Alert Actions 118:

int RaiseLogicalAction(char* action_type, aUtilAlertinfo ainfo);

Return value:

if ==0, then the action was performed successfully.

if !=0, then an error.

Parameters:

action-type/input/Text string that identifies the action. This string is defined by the user via the Alert Policy Editor 114, and retrieved from the Alert Policy 120.

ainfo/input/Action information, as described by the following structure.

struct_aUtiLAlertInfo{
void* PVData;
long lThreshold;
long lActualValue;
long lEventId;
char szUtilityType[31];
char szSystemDate[11];
char szSystemTime[9];
char szEventInfo[121];

};
    typedef struct_aUtilAlertInfo aUtilAlertInfo;
    With regard to this API, the fields of the structure are defined as follows:

PVData—A pointer to specific data for the Alert Action 118.
    lThreshold—The event count established by the Alert Policy 120 when the number of events equals or exceeds this threshold, an alert is raised.
    lActualValue—The actual number of events seen in the log.
    lEventId—The identifier of the event for which the alert is being raised.
    szUtilityType—Description of the event source.
    szSystemDate—Date on which the event was recorded.
    szSystemTime—Time at which the event was recorded.
    szEventInfo—Optional text associated with the event.

Logic of the Preferred Embodiment

Figure 2:
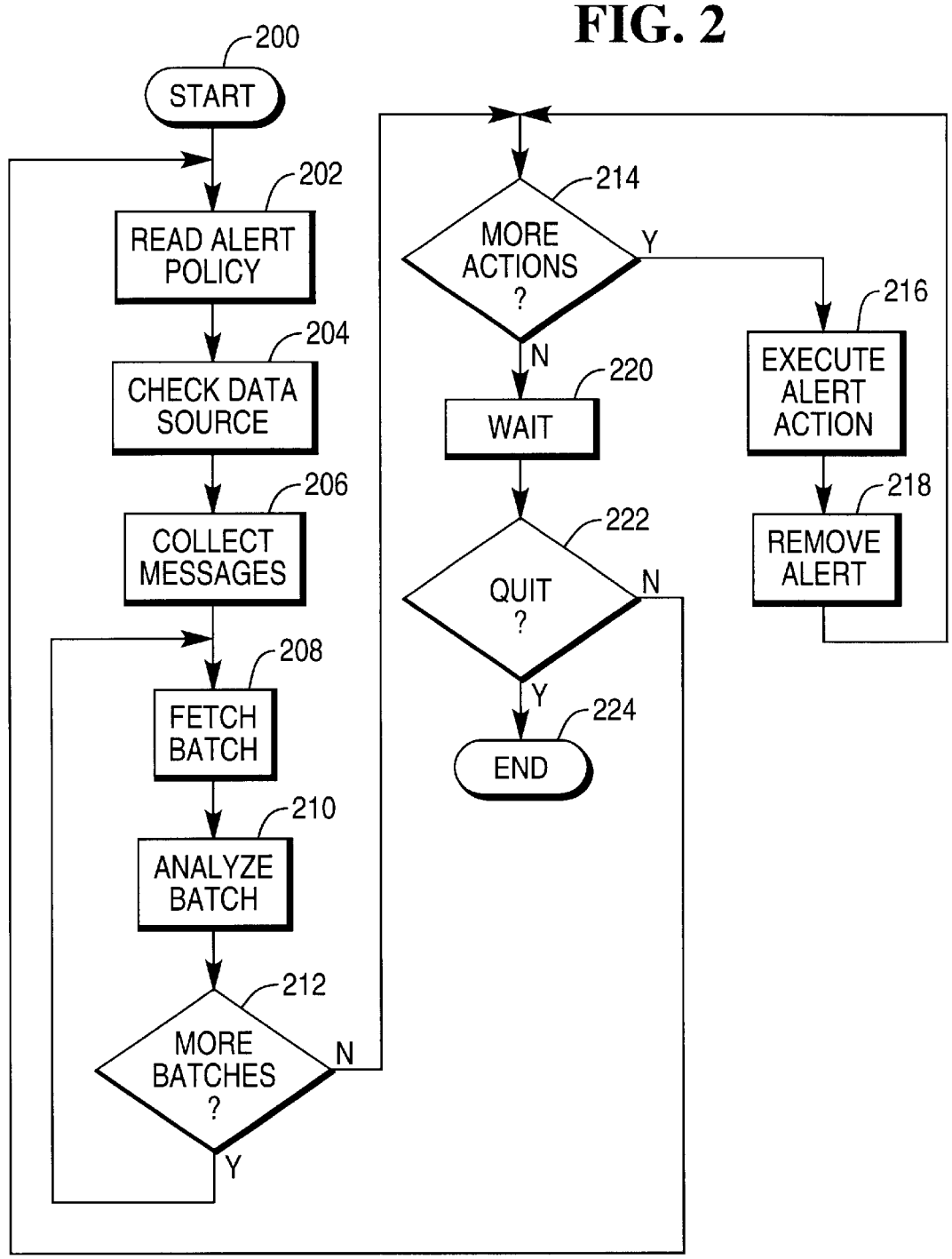
FIGS. 2, 3 and 4 are flowcharts that illustrate the logic performed according to the preferred embodiment of the present invention.
Figure 3:
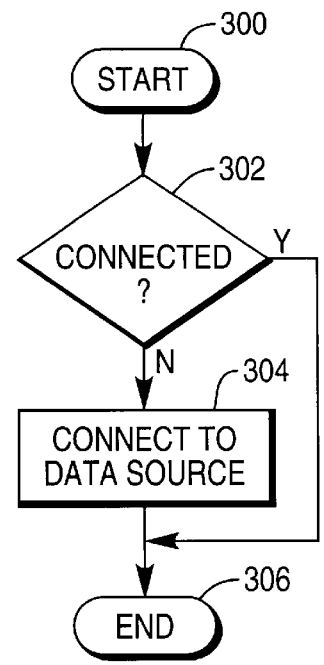

FIGS. 2, 3 and 4 are flowcharts that illustrate the logic performed according to the preferred embodiment of the present invention.

Referring to FIG. 2, Block 200 represents the start of the logic.

Block 202 represents the Event Monitoring and Alerting Service 108 reading the Alert Policy 120 by invoking the GetEventPolicy API of the AlertPolicy DLL 112. The returned Alert Policy 120 is cached in memory until the Event Monitoring and Alerting Service 108 is terminated or a new Alert Policy 120 is read.

Block 204 represents the Event Monitoring and Alerting Service 108 checking the data source connection. As shown in FIG. 3, the Event Monitoring and Alerting Service 108 establishes a connection (or database session) with the Event Log 124, if such a connection has not already been established.

Block 206 represents the Event Monitoring and Alerting Service 108 collecting event messages by querying the Event Log 124 using the Application Protocol Drivers 110 and 122.

Block 208 represents the Event Monitoring and Alerting Service 108 fetching event messages from the Event Log 124. Rather than fetch the results of Block 206 all at once, the Event Monitoring and Alerting Service 108 fetches and analyzes messages in batches. Generally, the preferred embodiment minimizes the volume of event messages that are fetched from the Event Log 124 by fetching only those messages that have been added to the Event Log 124 since the last monitoring iteration. Moreover, if the Event Log 124 is a table in a relational database management system (RDBMS), then additional reductions in the volume of fetched data can be achieved by querying just those messages with an Event ID that matches an ID in the Alert Policy 120.

The advantages of this technique include the efficient use of system resources (e.g., virtual memory, I/O bandwidth), which is accomplished by processing messages in batches of manageable size. Moreover, this technique allows the Event Monitoring and Alerting Service 108 to process large quantities of event messages from the Event Log 124 without exhausting resources on the Client Computer 102. As a result, this technique allows the Event Monitoring and Alerting Service 108 to avoid fatal exception conditions that occur when no more system resources are available.

Block 210 represents the Event Monitoring and Alerting Service 108 analyzing the fetched batch of event messages. The Event Monitoring and Alerting Service 108 tests the rules of the Alert Policy 120 against the event messages using the steps of FIG. 4.

Block 212 is a decision block that represents the Event Monitoring and Alerting Service 108 determining whether there are more batches of event messages to be fetched from the Event Log 124. If so, control transfers to Block 208; otherwise, control transfers to Block 214.

Block 214 is a decision block that represents the Event Monitoring and Alerting Service 108 determining whether there are more Alert Actions 118 in a global Alert Table List, i.e., more alerts to be raised. If so, control transfers to Block 216; otherwise, control transfers to Block 220.

Block 216 represents the Event Monitoring and Alerting Service 108 executing the next Alert Action 118 in the global Alert Table List.

Block 218 represents the Event Monitoring and Alerting Service 108 removing the Alert Action 118 (i.e., freeing memory from the global Alert Table List. Thereafter, control transfers back to Block 214.

Block 220 represents the Event Monitoring and Alerting Service 108 waiting until the next refresh time has arrived or the user sends a "QUIT" message.

Block 222 is a decision block that represents the Event Monitoring and Alerting Service 108 determining whether the Event Monitoring and Alerting Service 108 was wakened by a "QUIT" message. If so, control transfers to Block 224; otherwise, control transfers to Block 202.

Block 224 represents the Event Monitoring and Alerting Service 108 terminating.

Referring to FIG. 3, Block 300 represents the start of the logic.

Block 302 is a decision block that represents the Event Monitoring and Alerting Service 108 determining whether a connection (or database session) with a data source has been established. If so, control transfers to Block 306; otherwise, control transfers to Block 304.

Block 304 represents the Event Monitoring and Alerting Service 108 establishing a connection (or database session) with the data source.

Thereafter, control returns to FIG. 2.

Figure 4A:
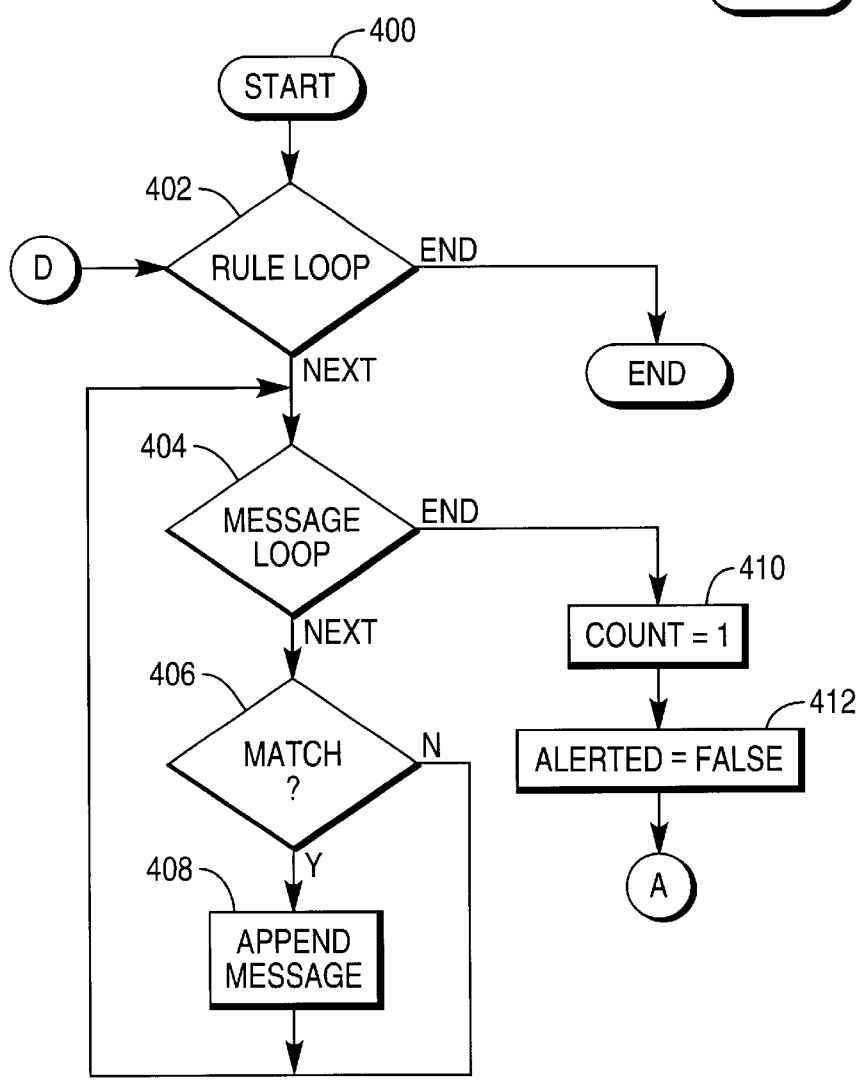

Referring to FIG. 4A, Block 400 represents the start of the logic.

Block 402 is a decision block that represents the Event Monitoring and Alerting Service 108 looping through all the rules in the Alert Policy 120. For every rule, control transfers to Block 404; upon completion, control returns to FIG. 2.

Block 404 is a decision block that represents the Event Monitoring and Alerting Service 108 looping through all the event messages in the current batch. For every message, control transfers to Block 406; upon completion, control transfers to Block 410.

Block 406 is a decision block that represents the Event Monitoring and Alerting Service 108 determining whether the Event ID associated with the event message matches an Event ID in the szIDList of the rule, and, if the szPhrase is not empty, whether the text of the event message includes the Search Phrase. If so, control transfers to Block 408; otherwise, control transfers to Block 404.

Block 408 represents the Event Monitoring and Alerting Service 108 appending the event message to the history list of the rule.

Block 410 represents the Event Monitoring and Alerting Service 108 setting the variable COUNT to 1.

Block 412 represents the Event Monitoring and Alerting Service 108 setting the "Alerted" flag of the rule to FALSE.

Figure 4B:
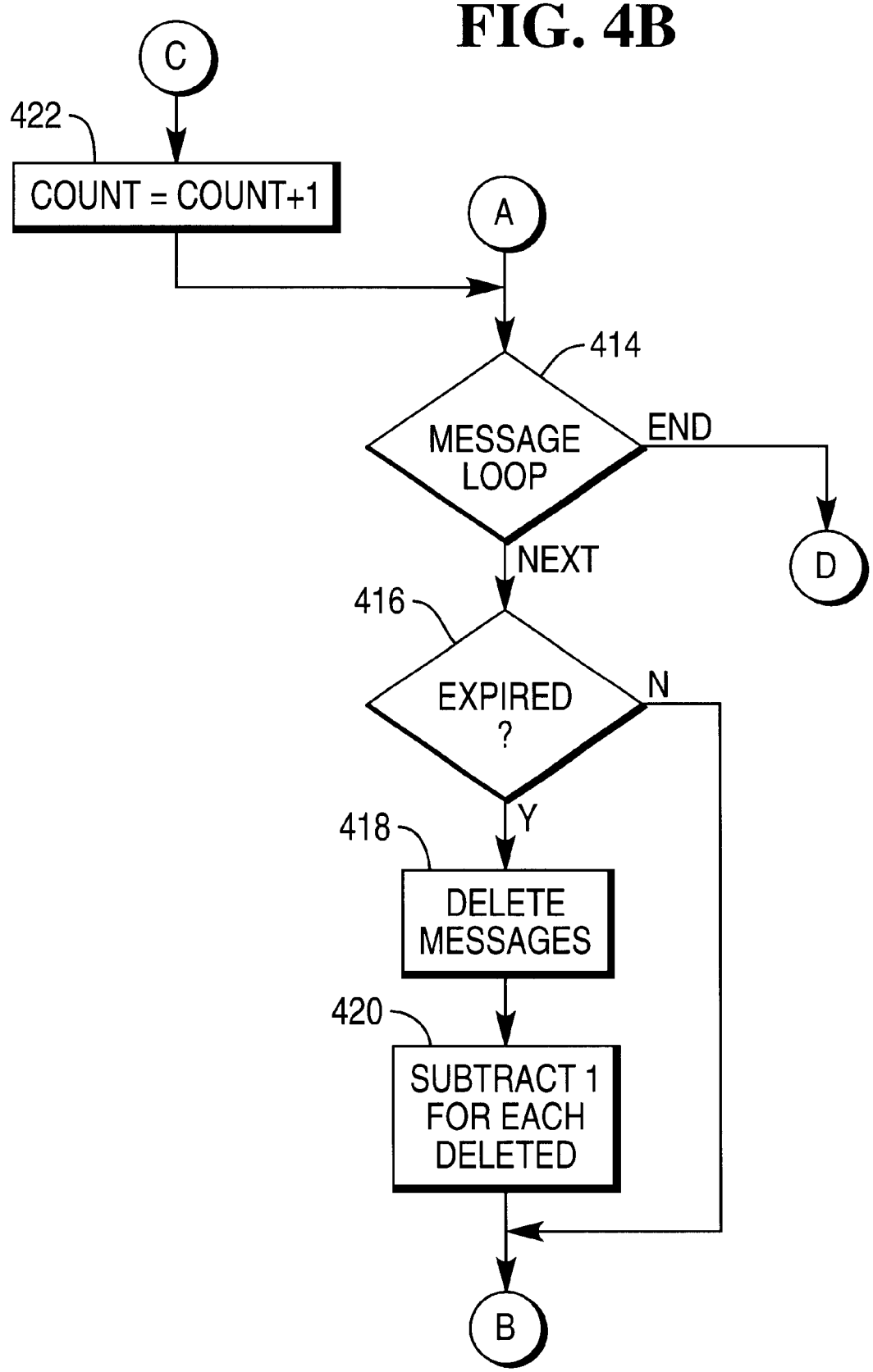

Thereafter, control transfers to FIG. 4B via "A".

Referring to FIG. 4B, Block 414 is a decision block that represents the Event Monitoring and Alerting Service 108 looping through all the event messages on the history list of the rule. For every message, control transfers to Block 416; upon completion, control returns to FIG. 4A via "D".

Block 416 is a decision block that represents the Event Monitoring and Alerting Service 108 determining whether the Event Period has expired, i.e., the time between this event message and the oldest event message on the history list of the rule is greater than the Event Period of the rule. If so, control transfers to Block 418; otherwise, control transfers to FIG. 4C via "B".

Block 418 represents the Event Monitoring and Alerting Service 108 deleting the oldest event messages from the history list of the rule until the time between the oldest remaining event message and the current event message is less than or equal to Event Period of the rule.

Block 420 represents the Event Monitoring and Alerting Service 108 subtracting 1 from COUNT for each deleted message. Thereafter, control transfers to FIG. 4C via "B".

Block 422 increments COUNT and then transfers control to Block 414.

Figure 4C:
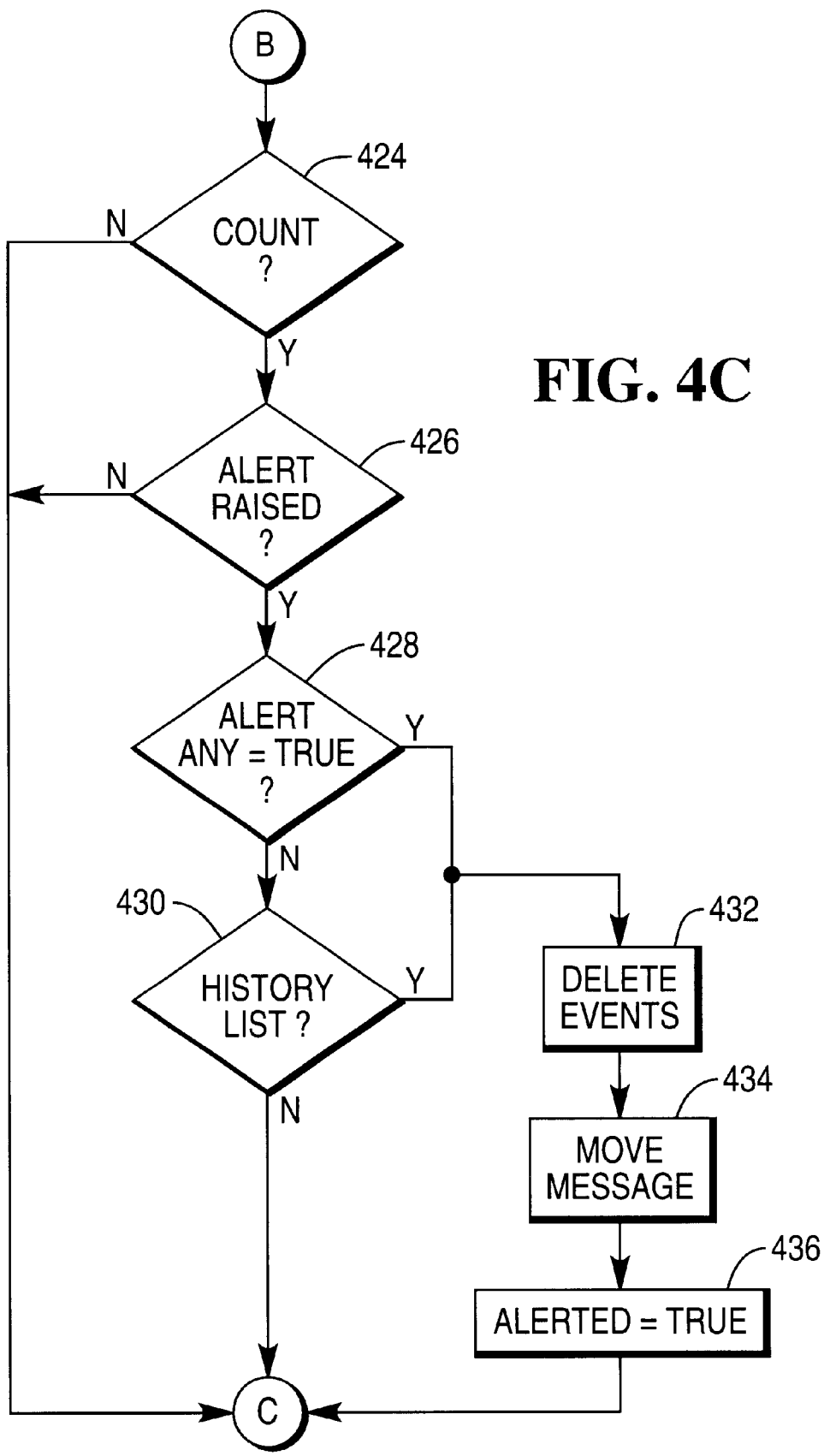

Referring to FIG. 4C, Block 424 is a decision block that represents the Event Monitoring and Alerting Service 108 determining whether COUNT is greater than or equal to the Event Count of the rule. If so, control transfers to Block 426; otherwise, control transfers to FIG. 4B via "C".

Block 426 is a decision block that represents the Event Monitoring and Alerting Service 108 determining whether an alert was raised. If not, control transfers to Block 428; otherwise, control transfers to Block 424.

Block 428 is a decision block that represents the Event Monitoring and Alerting Service 108 determining whether the Alert Any flag for the rule is true. If so, control transfers to Block 432; otherwise, control transfers to Block 430.

Block 430 is a decision block that represents the Event Monitoring and Alerting Service 108 determining whether the history list for the rule contains at least one event message for each Event ID in the szIDList of the rule. If so, control transfers to Block 432; otherwise, control transfers to FIG. 4B via "C".

Block 432 represents the Event Monitoring and Alerting Service 108 deleting any event messages from the history list of the rule that are older than the event message currently being reviewed.

Block 434 represents the Event Monitoring and Alerting Service 108 moving the current event message, along with szAction (representing the Alert Action 118) of the rule, to the global Alert Table List.

Block 436 represents the Event Monitoring and Alerting Service 108 setting the Alerted flag of the rule to TRUE, thereby indicating that there is only one alert per rule per refresh iteration.

Thereafter, control transfers to FIG. 4B via "C".

Conclusion

This concludes the description of the preferred embodiments of the present invention. In summary, the present invention describes a method, apparatus, and article of manufacture for monitoring and alerting on an event log. One or more alert policies is accessed, wherein each of the alert policies is comprised of one or more rules stored on a computer. An event log stored on a computer is accessed in a location-independent manner to gather one or more event messages stored therein. The event messages are filtered by comparing them to the rules of the alert policies to raise an alert and determine whether an alert action should be invoked.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for monitoring and alerting on an event log, comprising:
   (a) accessing one or more alert policies comprised of one or more rules stored on a computer;
   (b) accessing an event log stored on a computer in a location-independent manner to gather one or more event messages stored therein;
   (c) filtering the event messages by comparing the event messages to the rules of the alert policies to raise an alert and determine whether an alert action should be invoked; and
   (d) periodically checking the alert policies to dynamically adopt updated ones of the alert policies.

2. The method of claim 1, wherein the event log resides on a first computer and the filtering step is performed on a second computer.

3. A method for monitoring and alerting on an event log, comprising:
   (a) accessing one or more alert policies comprised of one or more rules stored on a computer;
   (b) accessing an event log stored on a computer in a location-independent manner to gather one or more event messages stored therein; and
   (c) filtering the event messages by comparing the event messages to the rules of the alert policies to raise an alert and determine whether an alert action should be invoked; and
   wherein the alert policies contain criteria by which the event log is searched, the alerts are raised, and the alert actions are invoked.

4. A method for monitoring and alerting on an event log, comprising:
   (a) accessing one or more alert policies comprised of one or more rules stored on a computer;
   (b) accessing an event log stored on a computer in a location-independent manner to gather one or more event messages stored therein; and
   (c) filtering the event messages by comparing the event messages to the rules of the alert policies to raise an alert and determine whether an alert action should be invoked; and
   wherein each rule includes one or more defined criteria selected from a group comprising:
      one or more Event IDs,
      an Event Period indicating a period within which the event messages must occur in the event log for an alert to be raised and an alert action to be invoked,
      an Event Count indicating a count of the event messages that must occur within the event log within the Event Period and corresponding to the Event IDs to raise an alert and trigger an alert action,
      a Search Phrase that specifies one or more words that must be included within the event messages, and an Alert Any flag that determines whether or not there must be at least one occurrence of each and every Event ID that is specified by the rule.

5. The method of claim 4, wherein the Alert Any flag indicates that an alert is to be raised when the count of event messages in the event log equals or exceeds the Event Count within the Event Period for any combination of qualified Event IDs.

6. The method of claim 4, wherein the Alert Any flag indicates that an alert is to be raised when the count of event messages in the event log equals or exceeds the Event Count within the Event Period and there has been at least one occurrence of each Event ID in the event messages.

7. The method of claim 4, wherein a refresh rate determines how often the alert policies are checked for updates.

8. The method of claim 4, wherein a refresh rate determines how often the event log is queried for the event messages.

9. A method for monitoring and alerting on an event log, comprising:
   (a) accessing one or more alert policies comprised of one or more rules stored on a computer;
   (b) accessing an event log stored on a computer in a location-independent manner to gather one or more event messages stored therein; and
   (c) filtering the event messages by comparing the event messages to the rules of the alert policies to raise an alert and determine whether an alert action should be invoked; and
   wherein each rule specifies an alert action selected from a group comprising sending an email to a user-defined address, sending a page with a user-defined message to a user-defined paging service, generating a trap, running a user-specified program, writing a message to log, and executing a script of database commands.

10. The method of claim 9, wherein the alert action comprises a plurality of individual alert actions.

11. The method of claim 9, wherein each rule specifies a period that must expire before an alert action is repeated.

12. A method for monitoring and alerting on an event log, comprising:
   (a) accessing one or more alert policies comprised of one or more rules stored on a computer;
   (b) accessing an event log stored on a computer in a location-independent manner to gather one or more event messages stored therein;
   (c) filtering the event messages by comparing the event messages to the rules of the alert policies to raise an alert and determine whether an alert action should be invoked; and
   (d) defining the alert policies using an alert policy editor.

13. A computer-implemented apparatus for monitoring and alerting on an event log, comprising:
   (a) means for accessing one or more alert policies comprised of one or more rules stored on a computer;
   (b) means for accessing an event log stored on a computer in a location-independent manner to gather one or more event messages stored therein;
   (c) means for filtering the event messages by comparing the event messages to the rules of the alert policies to raise an alert and determine whether an alert action should be invoked; and
   (d) means for periodically checking the alert policies to dynamically adopt updated ones of the alert policies.

14. The apparatus of claim 13, wherein the event log resides on a first computer and the filtering step is performed on a second computer.

15. A computer-implemented apparatus for monitoring and alerting on an event log, comprising:
   (a) means for accessing one or more alert policies comprised of one or more rules stored on a computer;
   (b) means for accessing an event log stored on a computer in a location-independent manner to gather one or more event messages stored therein; and
   (c) means for filtering the event messages by comparing the event messages to the rules of the alert policies to raise an alert and determine whether an alert action should be invoked; and
   wherein the alert policies contain criteria by which the event log is searched, the alerts are raised, and the alert actions are invoked.

16. A computer-implemented apparatus for monitoring and alerting on an event log, comprising:
   (a) means for accessing one or more alert policies comprised of one or more rules stored on a computer;
   (b) means for accessing an event log stored on a computer in a location-independent manner to gather one or more event messages stored therein; and
   (c) means for filtering the event messages by comparing the event messages to the rules of the alert policies to raise an alert and determine whether an alert action should be invoked; and
   wherein each rule includes one or more defined criteria selected from a group comprising:
      one or more Event IDs,
      an Event Period indicating a period within which the event messages must occur in the event log for an alert to be raised and an alert action to be invoked,
      an Event Count indicating a count of the event messages that must occur within the event log within the Event Period and corresponding to the Event IDs to raise an alert and trigger an alert action,
      a Search Phrase that specifies one or more words that must be included within the event messages, and
      an Alert Any flag that determines whether or not there must be at least one occurrence of each and every Event ID that is specified by the rule.

17. The apparatus of claim 16, wherein the Alert Any flag indicates that an alert is to be raised when the count of event messages in the event log equals or exceeds the Event Count within the Event Period for any combination of qualified Event IDs.

18. The apparatus of claim 16, wherein the Alert Any flag indicates that an alert is to be raised when the count of event messages in the event log equals or exceeds the Event Count within the Event Period and there has been at least one occurrence of each Event ID in the event messages.

19. The apparatus of claim 16, wherein a refresh rate determines how often the alert policies are checked for updates.

20. The apparatus of claim 16, wherein a refresh rate determines how often the event log is queried for the event messages.

21. A computer-implemented apparatus for monitoring and alerting on an event log, comprising:
   (a) means for accessing one or more alert policies comprised of one or more rules stored on a computer;
   (b) means for accessing an event log stored on a computer in a location-independent manner to gather one or more event messages stored therein; and
   (c) means for filtering the event messages by comparing the event messages to the rules of the alert policies to raise an alert and determine whether an alert action should be invoked; and wherein each rule specifies an alert action selected from a group comprising sending an email to a user-defined address, sending a page with a user-defined message to a user-defined paging service, generating a trap, running a user-specified program, writing a message to log, and executing a script of database commands.

22. The apparatus of claim 21, wherein the alert action comprises a plurality of individual alert actions.

23. The apparatus of claim 21, wherein each rule specifies a period that must expire before an alert action is repeated.

24. A computer-implemented apparatus for monitoring and alerting on an event log, comprising:
  (a) means for accessing one or more alert policies comprised of one or more rules stored on a computer;
  (b) means for accessing an event log stored on a computer in a location-independent manner to gather one or more event messages stored therein; and
  (c) means for filtering the event messages by comparing the event messages to the rules of the alert policies to raise an alert and determine whether an alert action should be invoked; and
  (d) means for defining the alert policies using an alert policy editor.

25. An article of manufacture embodying logic for monitoring and alerting on an event log, the logic comprising:
  (a) accessing one or more alert policies comprised of one or more rules stored on a computer;
  (b) accessing an event log stored on a computer in a location-independent manner to gather one or more event messages stored therein;
  (c) filtering the event messages by comparing the event messages to the rules of the alert policies to raise an alert and determine whether an alert action should be invoked; and
  (d) periodically checking the alert policies to dynamically adopt updated ones of the alert policies.

26. The article of manufacture of claim 25, wherein the event log resides on a first computer and the filtering step is performed on a second computer.

27. An article of manufacture embodying logic for monitoring and alerting on an event log, the logic comprising:
  (a) accessing one or more alert policies comprised of one or more rules stored on a computer;
  (b) accessing an event log stored on a computer in a location-independent manner to gather one or more event messages stored therein; and
  (c) filtering the event messages by comparing the event messages to the rules of the alert policies to raise an alert and determine whether an alert action should be invoked; and
  wherein the alert policies contain criteria by which the event log is searched, the alerts are raised, and the alert actions are invoked.

28. An article of manufacture embodying logic for monitoring and alerting on an event log, the logic comprising:
  (a) accessing one or more alert policies comprised of one or more rules stored on a computer;
  (b) accessing an event log stored on a computer in a location-independent manner to gather one or more event messages stored therein; and
  (c) filtering the event messages by comparing the event messages to the rules of the alert policies to raise an alert and determine whether an alert action should be invoked; and
  wherein each rule includes one or more defined criteria selected from a group comprising:
    one or more Event IDs,
    an Event Period indicating a period within which the event messages must occur in the event log for an alert to be raised and an alert action to be invoked,
    an Event Count indicating a count of the event messages that must occur within the event log within the Event Period and corresponding to the Event IDs to raise an alert and trigger an alert action,
    a Search Phrase that specifies one or more words that must be included within the event messages, and
    an Alert Any flag that determines whether or not there must be at least one occurrence of each and every Event ID that is specified by the rule.

29. The article of manufacture of claim 28, wherein the Alert Any flag indicates that an alert is to be raised when the count of event messages in the event log equals or exceeds the Event Count within the Event Period for any combination of qualified Event IDs.

30. The article of manufacture of claim 28, wherein the Alert Any flag indicates that an alert is to be raised when the count of event messages in the event log equals or exceeds the Event Count within the Event Period and there has been at least one occurrence of each Event ID in the event messages.

31. The article of manufacture of claim 28, wherein a refresh rate determines how often the alert policies are checked for updates.

32. The article of manufacture of claim 28, wherein a refresh rate determines how often the event log is queried for the event messages.

33. An article of manufacture embodying logic for monitoring and alerting on an event log, the logic comprising:
  (a) accessing one or more alert policies comprised of one or more rules stored on a computer;
  (b) accessing an event log stored on a computer in a location-independent manner to gather one or more event messages stored therein; and
  (c) filtering the event messages by comparing the event messages to the rules of the alert policies to raise an alert and determine whether an alert action should be invoked; and
  wherein each rule specifies an alert action selected from a group comprising sending an email to a user-defined address, sending a page with a user-defined message to a user-defined paging service, generating a trap, running a user-specified program, writing a message to log, and executing a script of database commands.

34. The article of manufacture of claim 33, wherein the alert action comprises a plurality of individual alert actions.

35. The article of manufacture of claim 33, wherein each rule specifies a period that must expire before an alert action is repeated.

36. An article of manufacture embodying logic for monitoring and alerting on an event log, the logic comprising:
  (a) accessing one or more alert policies comprised of one or more rules stored on a computer;
  (b) accessing an event log stored on a computer in a location-independent manner to gather one or more event messages stored therein; and
  c) filtering the event messages by comparing the event messages to the rules of the alert policies to raise an alert and determine whether an alert action should be invoked; and
  (d) logic for defining the alert policies using an alert policy editor.

* * * * *